United States Patent
Kazmierczak

(10) Patent No.: US 7,170,192 B2
(45) Date of Patent: Jan. 30, 2007

(54) DATA TRANSMISSION BETWEEN A CHASSIS AND A SEAT MOVABLY ARRANGED ON THE CHASSIS

(75) Inventor: Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 10/714,377

(22) Filed: Nov. 12, 2003

(65) Prior Publication Data

US 2004/0124704 A1 Jul. 1, 2004

(30) Foreign Application Priority Data

Dec. 7, 2002 (DE) .............................. 102 57 272

(51) Int. Cl.
*B60L 1/00* (2006.01)
(52) U.S. Cl. ...................................... 307/9.1; 307/10.1
(58) Field of Classification Search ................. 307/9.1, 307/10.1
See application file for complete search history.

(56) References Cited

U.S. PATENT DOCUMENTS 5,890,779 A * 4/1999 Blackburn et al. ......... 307/10.1

* cited by examiner

*Primary Examiner*—Robert L. DeBeradinis
(74) *Attorney, Agent, or Firm*—Kenyon & Kenyon LLP

(57) ABSTRACT

A system for transmitting data and/or energy between a chassis and a seat that is movably arranged on the chassis, the seat being able to glide with the aid of slides in guide rails attached to the chassis; one iron-core half of a transformer, the iron-core half bearing at least one primary winding is positioned on the slide gliding in the guide rail, the primary winding being a cable in the guide rail; and the other iron-core half of the transformer, having a secondary winding, is positioned on the seat, the two limbs of the other iron-core half being arranged in the longitudinal direction with respect to the guide rail, and both iron-core halves of the transformer being positioned relative to each other for the data and/or energy transmission.

7 Claims, 3 Drawing Sheets

DATA TRANSMISSION BETWEEN A CHASSIS AND A SEAT MOVABLY ARRANGED ON THE CHASSIS

FIELD OF THE INVENTION

The present invention relates to a system for transmitting data and/or energy between a chassis and a seat arranged in a movable manner on the chassis, the seat being able to glide with the aid of slides in guide rails attached to the chassis.

BACKGROUND INFORMATION

To increase the safety of vehicle occupants, more and more functions are being integrated into the seats of vehicles, these functions being controlled and monitored electronically on the chassis side. Among these functions, in addition to the monitoring and triggering of airbags integrated in the seats, are also queries concerning seat occupancy and seat belt buckles, as well as child-seat detection for the optimal triggering of occupant restraint systems.

In general, data is transmitted in vehicles by bus systems via cable. This type of data transmission has proven itself. However, for vehicle seats, there is the problem that if the seats are mounted on rails allowing movement on the chassis of the vehicle, the cables must be tracked during a movement of the seat. In addition, the cables should be installed so that they cannot be damaged, and they should present no danger of stumbling for the occupants of the vehicle. The disassembly of the seats presents another problem. For this, particularly for vehicle types such as vans or sports utility vehicles (SUV) whose passenger compartment should be easily variable, the cable connection must be releasable via an easily accessible plug connection, and the cables and plugs remaining on the chassis side must be stowed away in the vehicle floor.

It has already been proposed to transmit data between a chassis and a seat in a cable-less manner using a transformer, the coupling of the seat to the chassis for the data transmission being effected via the iron core of the transformer, and the primary winding and secondary winding of the transformer being fixedly joined to the chassis and the seat, respectively.

For easy disassembly of the seat, the iron core of the transformer has a two-part design. One half of the iron core is positioned on a slide gliding in a guide rail, and the other half of the iron core is positioned on the seat which glides via the slide in the guide rail attached to the chassis. After the seat has been mounted on the slide, the two iron-core halves of the transformer are positioned relative to each other for the inductive data transmission and/or energy transmission, the one half of the iron core being able to glide with the slide in the guide rail during a movement of the seat.

To reduce the overall depth of the guide rail and for easy and inexpensive assembly, it is proposed that the primary winding of the transformer be formed as a line along the guide rail, the line being installed on a base in the guide rail so that the two yoke sections of the iron-core half arranged on the slide may be guided along it during a movement of the seat.

In the system described, because of the coupling of the iron-core halves, the opening in the upper region of the guide rail must be widened, which as a rule results in turning away from current catching or locking systems.

SUMMARY OF THE INVENTION

An object of the present invention is to improve the described system with respect to the magnetic coupling between the primary winding and the iron core, the intention being to permit a largely free design of the upper region of the guide rail.

According to the present invention, the data and/or energy is transmitted between the chassis and the seat using a transformer whose one iron-core half is positioned on a slide gliding in a guide rail, and whose other iron-core half is positioned on the seat which glides via the slide in the guide rail attached to the chassis. After the seat has been mounted on the slide, the two iron-core halves of the transformer are positioned relative to each other for the inductive data transmission and/or energy transmission, the two limbs of the other iron-core half being arranged in the longitudinal direction with respect to the guide rail.

The iron core thus formed takes up little space in width in the upper region of the guide rail, i.e. in the contact region between the two halves of the iron core. The upper slot-shaped opening of the guide rail may therefore be very narrow.

To achieve a small overall depth of the guide rail, as well as easy and inexpensive assembly, at least one primary winding of the transformer is implemented as a cable lying in the guide rail. The cable passes through the iron-core half arranged on the slide, this iron-core half being closed at the side facing the guide rail. With the other iron-core half mounted, this yields a closed ferromagnetic circuit with a low resistance of the magnetic flux in the ferromagnetic circuit. The production of the slide and the guide rail, and the mounting of the slide in the guide rail are facilitated.

During the movement of the slide in the guide rail, the cable glides through the iron core. In this context, stress to the cable, particularly due to friction between the iron core and the cable, may be reduced, in that the transformer iron-core half positioned on the slide is curved in such a way that it has an opening in the direction of the cable lying in the guide rail, through which the cable is guided in a straight line.

To prevent the cable from bringing foreign bodies, particularly iron-containing particles, into the transformer when the seat moves, the cable is tensioned in the guide rail by a clamping device to prevent contamination of the cable with foreign bodies from the bottom of the rail and/or foreign bodies adhering to the cable are removed by a cleaning device mounted on the slide.

DETAILED DESCRIPTION

In the present invention, the data is transmitted in a cable-less manner at the interface between the seat and the chassis via an inductive connection with the aid of a transformer having an iron core whose one half, with at least one primary winding, is mounted on a slide gliding in the guide rail, and whose other half, with at least one secondary winding, is mounted on the seat.

During the installation of the seat on the slide, the two iron-core halves of the transformer are positioned relative to each other for the inductive data transmission and/or energy transmission, the one iron-core half being able to glide with the slide in the guide rail during a movement of the seat. Existing cable connections may easily be replaced by the system of the present invention without having to change the existing data-transmission system of the vehicle. It may only be necessary to provide amplifiers on the seat side and/or the chassis side which condition, amplify and feed the signals to be transmitted or received into the bus system on the chassis side.

If no energy source is provided on the seat side for powering sensors or an amplifier, the needed energy (e.g. 5 watts) may likewise be transmitted from the chassis via the inductive connection to the seat, it being possible for the data signal to be transmitted to be modulated upon the energy-carrier wave. For a reciprocal data transmission between the seat and the chassis, it may be advantageous to provide separate primary and/or secondary windings on the transformer for the data and energy transmission, or in general to use separate transformers for this. In this context, a redundancy for the data and/or energy transmission may be attained for increasing the transmission reliability.

Figure 1A:
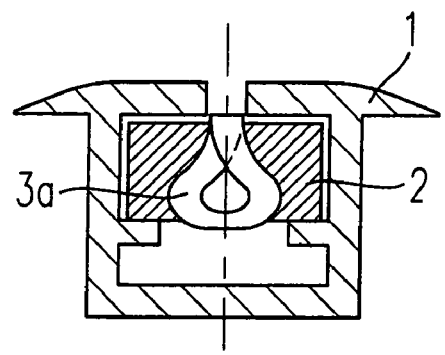
FIGS. 1a and 1b show the part of the data and energy transmission system integrated in the guide rail, according to one embodiment of the present invention.

FIG. 1a, in a sectional view, shows guide rail 1 and slide 2, gliding in it, which is used for accommodating a seat, together with iron-core half 3a in one embodiment according to the present invention. Guide rail 1 is usually set into the floor of a vehicle or is bolted to it and is used for accommodating a seat and its stepless or locking-type adjustment.

Figure 1B:
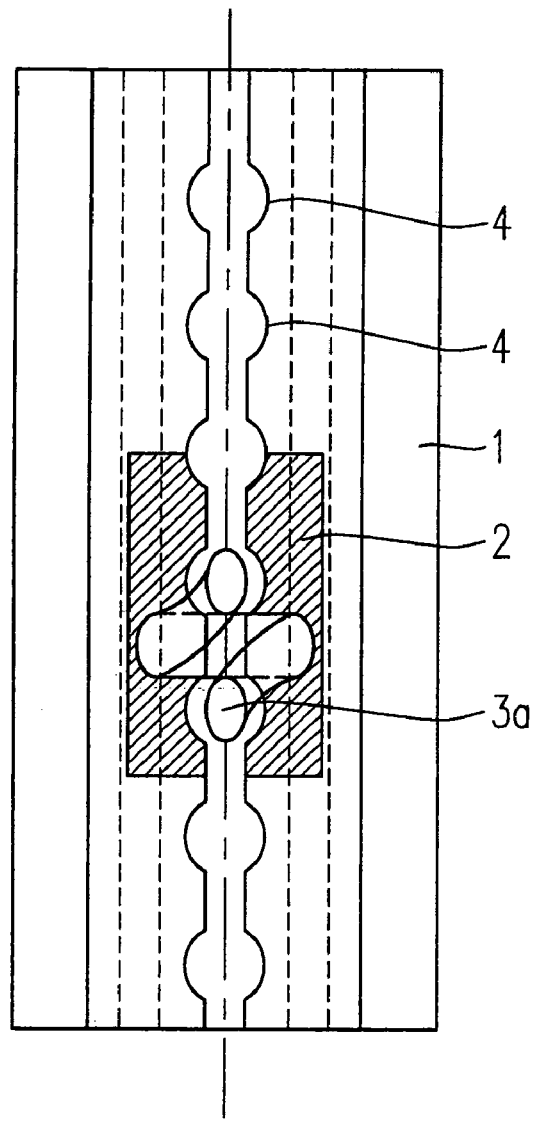

FIG. 1b shows guide rail 1 from FIG. 1a in a view from above. In the upper region, guide rail 1 has a narrow opening with snap-in holes 4. A stop bolt attached to the seat engages in these snap-in holes 4 in order to lock the seat in a desired position along guide rail 1 (not shown).

Iron-core half 3a situated on slide 2 is twisted so that the lower part of iron-core half 3a forms an eye that is aligned transversely with respect to guide rail 1, while the ends of the limbs are positioned along guide rail 1 and come out below the narrow upper opening of guide rail 1. The cable, the primary winding, lying in guide rail 1 is guided through this eye (not shown). At the same time, the iron-core half attached to the seat is aligned along guide rail 1. Therefore, only a narrow opening is necessary in guide rail 1 for the iron core. The primary winding is enclosed by the iron core, resulting in a good magnetic coupling between the primary winding and the iron core.

Figure 2A:
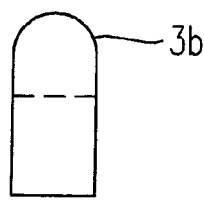
FIGS. 2a, 2b and 2c show various views of a specific embodiment of the iron-core half of the system according to the present invention, mounted on the seat.
Figure 2B:
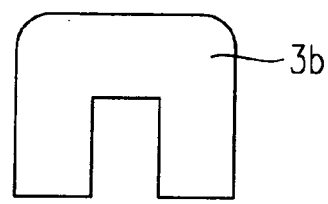
Figure 2C:
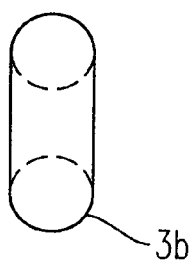
Figure 3A:
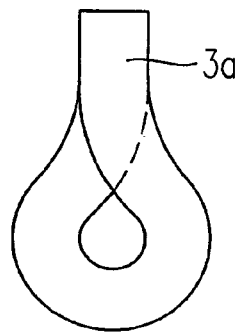
FIGS. 3a, 3b and 3c show various views of a specific embodiment of the iron-core half of the system according to the present invention, mounted on the slide.
Figure 3B:
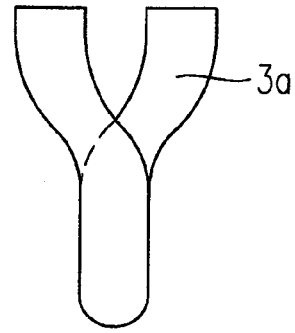
Figure 3C:
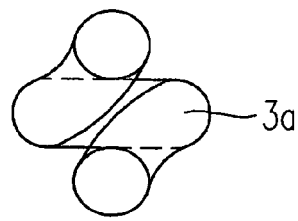

FIGS. 2a, 2b and 2c show a specific embodiment of iron-core half 3b, attached to the seat, in various views; and FIGS. 3a, 3b and 3c show the specific view of iron-core half 3a according to the present invention.

When the seat is moved, slide 2 glides in guide rail 1, and the cable glides through closed iron core 3a, 3b of the transformer. In so doing, iron-containing foreign bodies, in particular, should be prevented from getting into the interior of the transformer and thus reducing its efficiency.

Since guide rail 1 is generally located below the seat, foreign bodies may easily penetrate through its upwardly directed opening. For this, according to the present invention as shown in FIG. 3 by way of example, a clamping device 5a, 5b is disposed on guide rail 1 which lifts cable 6 off of the bottom of guide rail 1, and thus prevents cable 6 from coming into contact with foreign bodies on the bottom of guide rail 1.

Figure 3:
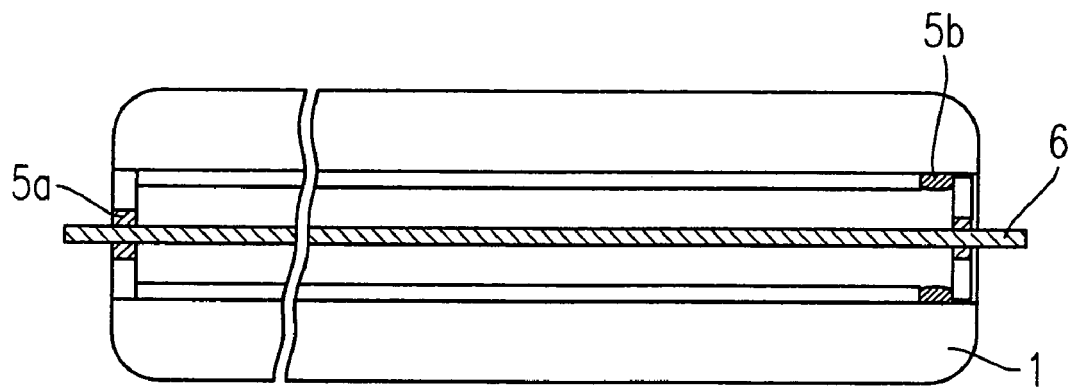
FIG. 3 shows an example for a cable-clamping device according to the present invention.

In the example shown in FIG. 3, clamping device 5a, 5b is made of two clamps 5a and 5b which are fastened to guide rail 1 and fix cable 6 in position at the level of the eye of iron-core half 3a, clamp 5b being flexibly attached to guide rail 1 and tensioning cable 6.

Figure 4:
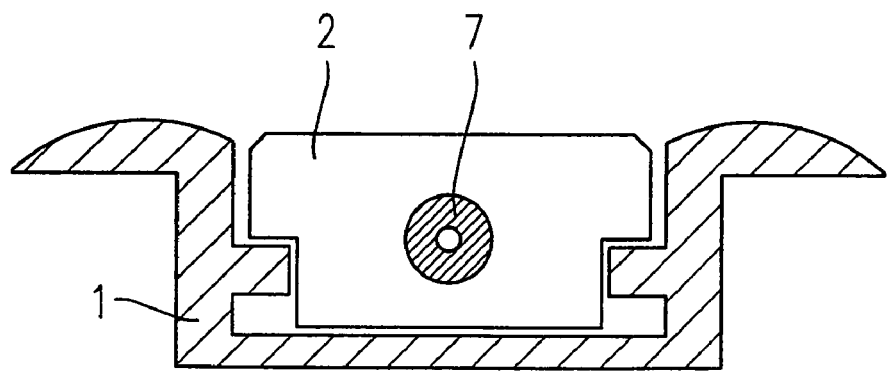
FIG. 4 shows an example for a cable-cleaning device according to the present invention.

In the example shown in FIG. 4, at the opening at which cable 6 enters into slide 2, a cleaning lip 7 is mounted which wipes off foreign bodies adhering to cable 6, and thus prevents these foreign bodies from penetrating into iron core 3a, 3b of the transformer. However, it is also possible to provide the exposed cable sections in front of and behind slide 2 with a protective sheath which is stretched or compressed during the movement of slide 2 in guide rail 1 (not shown).

The present invention is not limited to the examples described. Thus, it is also possible to provide a plurality of slides with transformers on one guide rail and/or, if the seat is secured by a plurality of guide rails, to likewise provide transformers at them, in order to create transmission paths separate from each other which may be necessary for safety reasons for activating and monitoring restraint systems integrated in the seats.

What is claimed is:

1. A system for transmitting at least one of data and energy between a chassis and a seat, the seat being situated in a movable manner on the chassis with the aid of at least one slide which glides in a guide rail attached to the chassis, the system comprising:

a transformer including a first iron-core half and a second iron-core half, the first iron-core half having at least one primary winding, the first iron-core half being situated on the slide, the primary winding including a cable lying in the guide rail, the second iron-core half having at least one secondary winding, the second iron-core half being situated on the seat, the second iron-core half including two limbs situated in a longitudinal direction with respect to the guide rail, the first and second iron-core halves being situated relative to each other for the at least one of the data and energy transmission.

2. The system according to claim 1, wherein the first iron-core half is curved in such a way that it has an opening in a direction of the cable lying in the guide rail, through which the cable is guided.

3. The system according to claim 1, wherein the cable is tensioned in the guide rail by a clamping device.

4. The system according to claim 1, wherein a cleaning device which removes foreign bodies adhering to the cable during a movement of the slide in the guide rail is situated on the slide.

5. The system according to claim 1, wherein the cable has at least two conductors, a first of the conductors being provided for the energy transmission and a second of the conductors being provided for the data transmission.

6. The system according to claim 1, wherein, on a seat side, the transformer has a secondary winding for the data transmission and a further secondary winding for the energy transmission.

7. The system according to claim 1, further comprising a further transformer situated between the slide and the seat, one of the transformers being adapted for data transmission and the other of the transformers being adapted for energy transmission.

* * * * *